United States Patent
Hansen et al.

(10) Patent No.: US 11,795,919 B2
(45) Date of Patent: Oct. 24, 2023

(54) CONNECTING ELEMENT FOR A LIGHTNING PROTECTION SYSTEM OF WIND TURBINE BLADE

(71) Applicant: LM WIND POWER INTERNATIONAL TECHNOLOGY II APS, Kolding (DK)

(72) Inventors: Lars Bo Hansen, Kolding (DK); Christian Gjerlevsen, Kolding (DK)

(73) Assignee: LM WIND POWER INTERNATIONAL TECHNOLOGY II APS, Kolding (DK)

( * ) Notice: Subject to any disclaimer, the term of this patent is extended or adjusted under 35 U.S.C. 154(b) by 0 days.

(21) Appl. No.: 17/051,017

(22) PCT Filed: May 27, 2019

(86) PCT No.: PCT/EP2019/063634
§ 371 (c)(1),
(2) Date: Oct. 27, 2020

(87) PCT Pub. No.: WO2019/228971
PCT Pub. Date: Dec. 5, 2019

(65) Prior Publication Data
US 2021/0140405 A1    May 13, 2021

(30) Foreign Application Priority Data
May 28, 2018  (EP) .................................... 18174629

(51) Int. Cl.
*F03D 80/30* (2016.01)
*F03D 1/06* (2006.01)

(52) U.S. Cl.
CPC ............ *F03D 80/30* (2016.05); *F03D 1/0658* (2013.01)

(58) Field of Classification Search
CPC ..................................................... F03D 80/30
See application file for complete search history.

(56) References Cited

U.S. PATENT DOCUMENTS

| | | |
|---|---|---|
| 2008/0156528 A1 | 7/2008 | Campbell et al. |
| 2010/0193235 A1 | 8/2010 | Taylor et al. |

(Continued)

FOREIGN PATENT DOCUMENTS

| | | |
|---|---|---|
| CN | 202991366 U | 6/2013 |
| CN | 103899496 A | 7/2014 |

(Continued)

*Primary Examiner* — Topaz L. Elliott
*Assistant Examiner* — Michael K. Reitz
(74) *Attorney, Agent, or Firm* — Nath, Goldberg & Meyer; Jerald L. Meyer; Tanya E. Harkins

(57) ABSTRACT

Disclosed is a wind turbine blade with a connecting element for a lightning protection system of the wind turbine blade. The connecting element comprising: a root end part configured to be mechanically and electrically connected to a root region of the wind turbine blade; and a conductor part comprising a first conductor part and a second conductor part, wherein the first conductor part is configured to receive and electrically connect to a stripped part of the down conductor and the second conductor part is configured to receive and mechanically connect to an insulated part of the down conductor.

14 Claims, 12 Drawing Sheets

(56) References Cited

U.S. PATENT DOCUMENTS

| | | | | |
|---|---|---|---|---|
| 2014/0271190 A1* | 9/2014 | Hansen | ................... | F03D 80/30 |
| | | | | 416/3 |
| 2014/0341738 A1* | 11/2014 | Bech | ....................... | F03D 80/30 |
| | | | | 416/146 R |
| 2015/0167642 A1* | 6/2015 | Hansen | ................. | F03D 1/0658 |
| | | | | 416/146 R |
| 2016/0258423 A1* | 9/2016 | Whitehouse | .......... | F03D 1/0675 |
| 2020/0271105 A1* | 8/2020 | Sutton | ..................... | B29C 66/54 |

FOREIGN PATENT DOCUMENTS

| | | | |
|---|---|---|---|
| EP | 2855929 A | 12/2013 |
| WO | 2006/099880 A1 | 9/2006 |
| WO | 2013/182447 A1 | 12/2013 |

\* cited by examiner

CONNECTING ELEMENT FOR A LIGHTNING PROTECTION SYSTEM OF WIND TURBINE BLADE

This is a National Phase Application filed under 35 U.S.C. 371 as a national stage of PCT/EP2019/063634, filed May 27, 2019, an application claiming the benefit of European Application No. 18174629.8, filed May 28, 2018, the content of each of which is hereby incorporated by reference in its entirety.

The present disclosure relates to a connecting element and a wind turbine blade comprising a connecting element and an associated method for a lightning protection system, such as a connecting element for connecting a down conductor of a lightning protection system of a wind turbine blade.

BACKGROUND

As wind turbines and wind turbine blades increase in size, the risk of lighting striking the wind turbine increases. It is therefore of increasing interest to provide wind turbines and in particular wind turbine blades with lightning protection measures.

It is known to provide blades for wind turbines with lightning receptors that are in electric connection with a down conductor, inside the blade, connected via the hub and nacelle of the wind turbine to the ground. The down conductor inside the blade may be connected to the root region of the wind turbine blade, such as the root end of the wind turbine blade, e.g. by a connecting element, also known as a cable shoe.

To reduce mechanical stress on the conducting part of the down conductor, the down conductor may be fastened, e.g. glued to the inside of the blade near the electrical connection. However, still mechanical failure may be seen near the connection between the down conductor and the blade.

SUMMARY

It is an object of the present disclosure to provide methods and elements for connecting a down conductor of a lightning protection system to the root region of the wind turbine blade, such as a root end flange of the wind turbine blade, in a more durable way, which is less prone to fatigue or other mechanical failure. It is a further object of the present disclosure to provide elements and methods facilitating easier and more convenient connection of the down conductor to the root region of the wind turbine blade.

Accordingly, the present disclosure relates to a connecting element for a lightning protection system of a wind turbine blade comprising a root region, an airfoil region with a tip, a pressure side, a suction side and a chord line extending between a leading edge and a trailing edge. The connecting element is configured to connect a down conductor of the lightning protection system to the root region, such as a root end flange of the root region, of the wind turbine blade. The connecting element comprises: a root end part configured to be mechanically and electrically connected to the root region of the wind turbine blade, and a conductor part comprising a first conductor part and a second conductor part, wherein the first conductor part is configured to receive and electrically connect to a stripped part of the down conductor and the second conductor part is configured to receive and mechanically connect to an insulated part of the down conductor.

The connecting element, such as the conductor part of the connecting element may define a conductor part axis. For example, a conductor part axis of the conductor part may be substantially coaxial with a longitudinal direction of the down conductor, e.g. when received in the conductor part.

Also disclosed is a wind turbine blade comprising a root region, an airfoil region with a tip, a pressure side, a suction side and a chord line extending between a leading edge and a trailing edge. The wind turbine blade further comprises a lightning protection system comprising a down conductor and a connecting element, such as the above disclosed connecting element, connecting the down conductor to the root region. The connecting element comprises: a root end part mechanically and electrically connected to the root region of the wind turbine blade; and a conductor part comprising a first conductor part and a second conductor part, wherein the first conductor part receives and electrically connects to a stripped part of the down conductor and the second conductor part receives and mechanically connects to an insulated part of the down conductor. A conductor part axis of the conductor part is substantially coaxial with a longitudinal direction of the down conductor.

Also disclosed is a method for connecting a down conductor of a lightning protection system of a wind turbine blade to the root region, such as a root end flange of the root region, of the wind turbine blade. The wind turbine blade comprises a root region, an airfoil region with a tip, a pressure side, a suction side and a chord line extending between a leading edge and a trailing edge. The down conductor comprises a conductive element and an insulating sheath covering the conductive element. The method comprising: Providing a connecting element, such as the above disclosed connecting element, comprising a root end part and a conductor part, the conductor part comprising a first conductor part and a second conductor part; removing the insulating sheath from a portion of an end part of the down conductor to provide a stripped part and an insulated part of the down conductor; inserting the end part of the down conductor into the conductor part of the connecting element, such that the stripped part is received by the first conductor part and the insulated part is received by the second conductor part of the connecting element, and such that a longitudinal direction of the down conductor is substantially coaxial with a conductor part axis of the conductor part; fastening the second conductor part to the insulated part; and fastening the root end part of the connecting element to the root region, such as the root end flange of the root region, of the wind turbine blade.

When the down conductor is connected to the root region of the wind turbine blade, the down conductor and the connector element may be located inside the wind turbine blade, e.g. the down conductor and the connector element may be on a tip side of the root end flange. The down conductor may extend from the root region, such as from the root end flange, e.g. when connected by the connector element. The down conductor may extend towards the tip of the wind turbine blade.

It is an advantage of the present disclosure that connection between the down conductor of the lightning protection system and the root region, such as the root end flange of the root region, is provided in an easier and more convenient way, and which may provide for increased strength and reduced likelihood of mechanical failure of the connection between the down conductor and the root region, e.g. the root end flange, of the wind turbine blade.

It is an advantage of the present disclosure that the disclosed connecting element provides for unloading of the cable, e.g. by mechanically fastening to the insulating sheath of the down conductor. Thereby reducing loads on critical portions of the transition between down conductor and connecting element. Furthermore, the present disclosure allows reduction of bending of the cable in the transition between the down conductor and connecting element.

The first conductor part and the second conductor part may be integrally formed. Alternatively or additionally, the conductor part and the root end part may be integrally formed.

The conductor part, such as the first conductor part and/or the second conductor part, may comprise an aperture for receiving the down conductor, such as a part of the down conductor. The conductor part, such as the first conductor part and/or the second conductor part may be substantially cylindrical, e.g. along the conductor part axis.

The first conductor part may have a first internal cross-sectional distance, e.g. a first internal cross-sectional diameter. The first internal cross-sectional distance may allow the first conductor part to receive the stripped part of the down conductor. The first internal cross-sectional distance may be the same or slightly more than a diameter of the stripped part of the down conductor, e.g. the first internal cross-sectional distance may be between 0.1-2 mm more than the diameter of the stripped part of the down conductor. The first internal cross-sectional distance may be smaller than a diameter of the insulated part of the down conductor.

The second conductor part may have a second internal cross-sectional distance, e.g. a second internal cross-sectional diameter. The second internal cross-sectional distance may be larger than the first internal cross-sectional distance. The second internal cross-sectional distance may allow the second conductor part to receive the insulated part of the down conductor. The second internal cross-sectional distance may be the same or slightly more than the diameter of the insulated part of the down conductor, e.g. the first internal cross-sectional distance may be between 0.1-2 mm more than the diameter of the insulated part of the down conductor.

The conductor part may have a material thickness along a radial axis perpendicular to the conductor part axis. For example, the material thickness may be between an inner circumference and an outer circumference of the conductor part. The material thickness may be substantially uniform in a cross-section perpendicular to the conductor part axis. The material thickness of the conductor part may different at different positions along the conductor part axis, e.g. the material thickness of the conductor part may be varying between different parts of the conductor part. The first conductor part may have a first material thickness along a radial axis perpendicular to the conductor part axis. The second conductor part may have a second material thickness parallel the radial axis. The second material thickness and the first material thickness may be the same. Alternatively, the second material thickness may be bigger than the first material thickness. Alternatively, the second material thickness may be smaller than the first material thickness.

The connecting element may be substantially rigid. For example, the connecting element may be made of a metal, such as copper, such as tinned copper. The connecting element may be annealed, e.g. the connecting element may be made of annealed metal, such as copper, such as tinned copper.

The root end part may comprise a fastening section, e.g. for engaging with a fastening element, e.g. a bolt or screw or similar, to fasten the connecting element to the root region of the wind turbine blade, such as a root end flange of the wind turbine blade. The fastening section may comprise a hole for receiving the fastening element. For example, the hole may be internally threaded, e.g. to engage with opposing threads of the fastening element.

The connecting element, such as the root end part of the connecting element, may comprise an internal separation structure. The internal separation structure may separate the fastening element, e.g. when inserted into the hole of the fastening section, from the stripped part of the down conductor. The internal separation structure may be an electrically conductive structure. The internal separation structure may provide mechanical strength to the connecting element.

The root end part may be substantially cylindrical, e.g. along the conductor part axis. The hole of the fastening section may extend along the conductor part axis. The connecting element may be substantially cylindrical, e.g. along the conductor part axis. The connecting element may be substantially cylindrical with a first end forming the root end part and a second end forming the conductor part.

The down conductor of the lightning protection system may comprise a conductive element and an insulating sheath covering the conductive element. The longitudinal direction of the down conductor may be the direction of the conductive element of the down conductor. The insulating sheath may be coaxial with the longitudinal direction of the down conductor.

Connecting the connecting element to the down conductor may comprise removing the insulating sheath from a portion of an end part of the down conductor to provide a stripped part of the down conductor. The stripped part of the down conductor may be inserted and received by the first conductor part to form an electrical connection between the conductive element of the down conductor and the connecting element. An insulated part of the down conductor may be received and fastened to the second conductor part of the connecting element.

Fastening the second conductor part to the insulated part may comprise crimping the second conductor part. For example, crimping the second conductor part may comprise reducing a cross-sectional distance, such as a first cross-sectional distance and/or a second cross sectional distance, of the second conductor part. A cross-sectional distance, such as the first cross-sectional distance and/or the second cross sectional distance, may be perpendicular to the longitudinal direction of the down conductor and/or the conductor part axis. For example, crimping the second conductor part may comprise reducing the first cross-sectional distance, such that the first cross-sectional distance is shorter than the second cross-sectional distance of the second conductor part. Alternatively or additionally, crimping the second conductor part may comprise reducing the first cross-sectional distance and the second cross-sectional distance, such that the first cross-sectional distance and the second cross-sectional distance are shorter than a third cross-sectional distance of the second conductor part. The first cross-sectional distance may be perpendicular to the second cross-sectional distance. The third cross-sectional distance may span an angle of 45 degrees with the first cross-sectional distance and the second cross-sectional distance.

The first conductor part may be fastened to the stripped part of the down conductor. Hence, the method may further comprise fastening the first conductor part to the stripped part of the down conductor.

Fastening the first conductor part to the stripped part may comprise crimping the first conductor part. For example, crimping the first conductor part may comprise reducing a cross-sectional distance, such as a first cross-sectional distance and/or a second cross sectional distance, of the first conductor part. A cross-sectional distance, such as the first cross-sectional distance and/or the second cross sectional distance of the first conductor part, may be perpendicular to the longitudinal direction of the down conductor and/or the conductor part axis. For example, crimping the first conductor part may comprise reducing the first cross-sectional distance of the first conductor part, such that the first cross-sectional distance is shorter than the second cross-sectional distance of the first conductor part. Alternatively or additionally, crimping the first conductor part may comprise reducing the first cross-sectional distance and the second cross-sectional distance of the first conductor part, such that the first cross-sectional distance and the second cross-sectional distance are shorter than a third cross-sectional distance of the first conductor part. The first cross-sectional distance may be perpendicular to the second cross-sectional distance of the first conductor part. The third cross-sectional distance of the first conductor part may span an angle of 45 degrees with the first cross-sectional distance and the second cross-sectional distance of the first conductor part.

The connecting element, such as the conductor part of the connecting element, may be enclosed by a second insulating sheath. Thus, the method may further comprise enclosing the connecting element and/or the conductor part of the connecting element with a second insulating sheath. The second insulating sheath may protect, such as environmentally protect, the connecting element and/or the conductor part of the connecting element. The second insulating sheath may be a shrinkable tubing, such as heat-shrink tubing. The second insulating sheath may be applied after fastening the second conductor part to the insulated part of the down conductor and/or after fastening the first conductor part to the stripped part of the down conductor.

BRIEF DESCRIPTION OF THE FIGURES

Embodiments of the disclosure will be described in more detail in the following with regard to the accompanying figures. The figures show one way of implementing the present invention and are not to be construed as being limiting to other possible embodiments falling within the scope of the attached claim set.

DETAILED DESCRIPTION

Figure 1:
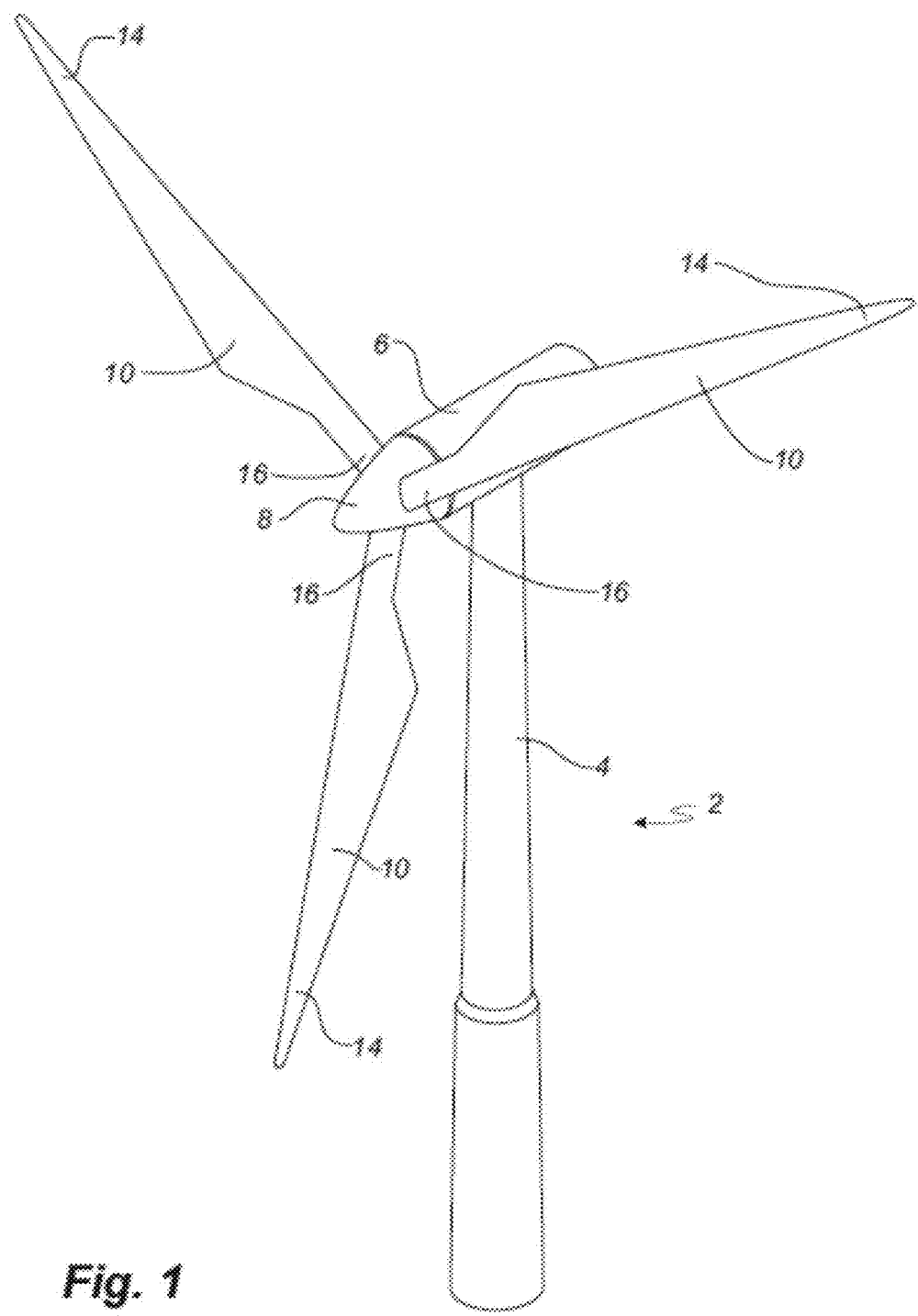
FIG. 1 is a schematic diagram illustrating an exemplary wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8, and three blades 10 extending radially from the hub 8, each having a blade root 16 nearest the hub and a blade tip 14 furthest from the hub 8.

Figure 2:
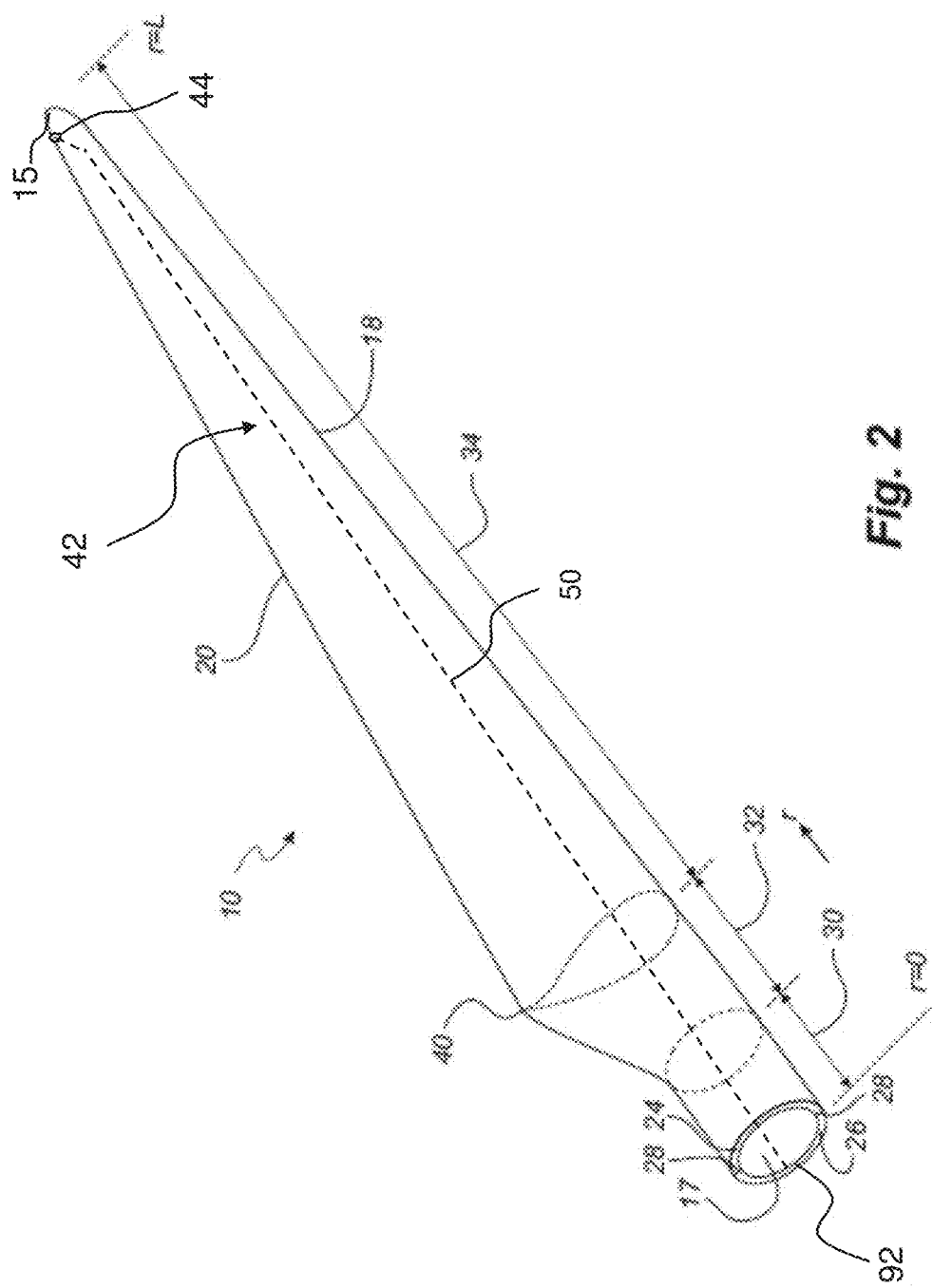
FIG. 2 is a schematic diagram illustrating an exemplary wind turbine blade.

FIG. 2 shows a schematic view of an exemplary wind turbine blade 10. The wind turbine blade 10 has the shape of a conventional wind turbine blade with a root end 17 and a tip end 15 and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 10 comprises a blade shell may comprise two blade shell parts, a first blade shell part 24 and a second blade shell part 26, typically made of fibre-reinforced polymer. The first blade shell part 24 is typically a pressure side or upwind blade shell part. The second blade shell part 26 is typically a suction side or downwind blade shell part. The first blade shell part 24 and the second blade shell part are typically glued together along bond lines or glue joints 28 extending along the trailing edge 20 and the leading edge 18 of the blade 10. Typically, the root ends of the blade shell parts 24, 26 has a semi-circular or semi-oval outer cross-sectional shape.

The wind turbine blade 10 further comprises a lightning protection system 42. The lightning protection system 42 comprises a lightning receptor 44 positioned near the tip end 15 of the wind turbine blade 10. The lightning protection system 42 comprises a down conductor 50 for connecting the lightning receptor 44 to the ground. The down conductor 50 is connected to the root region 30 of the blade 10, such as a root end flange 92 of the root region 30. The down conductor 50 extends from the root region 30 towards the tip end 15. The down conductor 50 extends from the root region 30 to the lightning receptor 44. A further conductor (not shown) may electrically connect the root end flange 92 to the ground, such as to form an electrical connection from the lightning receptor 44 and the ground. The lightning protection system 42 may further comprise a connecting element for connecting the down conductor to the root region 30 of the blade 10, such as the root end flange 92.

Figure 3:
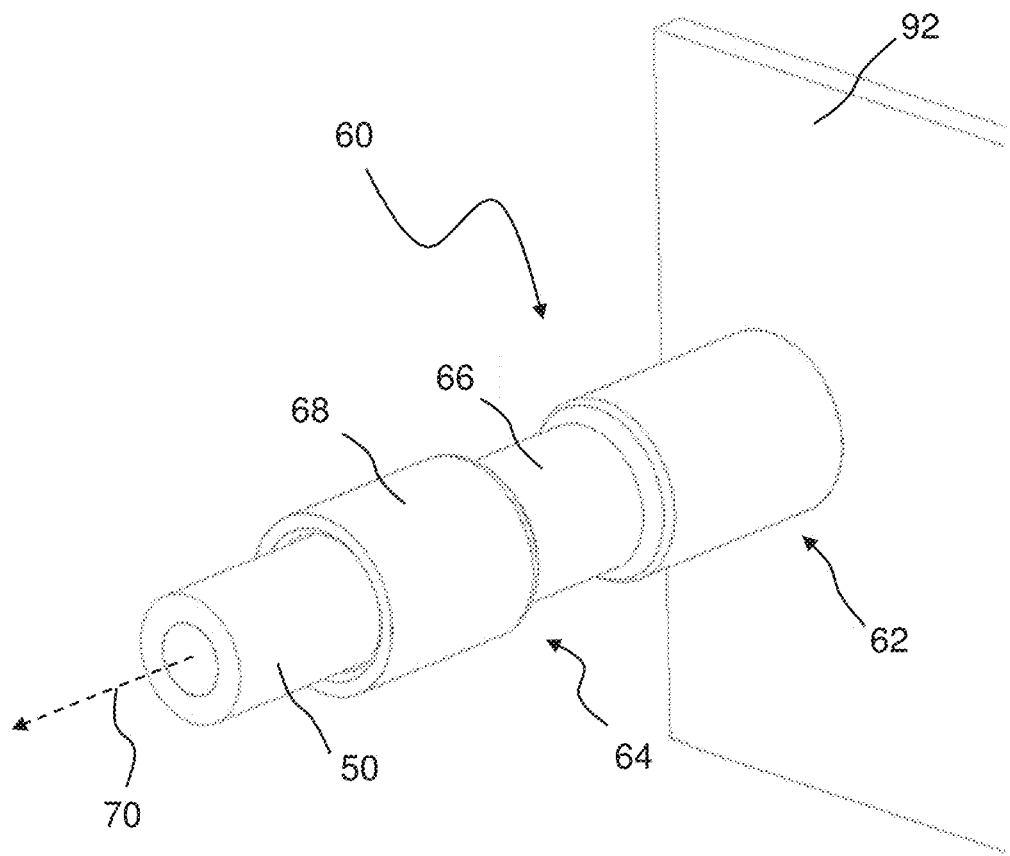
FIG. 3 is a schematic diagram illustrating an exemplary connecting element.

FIG. 3 shows an exemplary connecting element 60, such as a connecting element connecting the down conductor 50 to the root end flange 92 of a wind turbine blade, e.g. as described in relation to FIG. 2. The connecting element 60 is located on the tip side of the flange 92. The connecting element comprises a root end part 62 and a conductor part 64. The conductor part 64 comprises a first conductor part 66 and a second conductor part 68. A conductor part axis 70 of the conductor part 64 is substantially coaxial with a longitudinal direction of the down conductor 50 when received in the conductor part 64. The conductor part 64, such as the first conductor part 66 and the second conductor part 68, and the root end part 62 may be substantially coaxial with the conductor part axis 70, as shown. The conductor part 64, such as the first conductor part 66 and the second conductor part 68, and the root end part 62 may be substantially symmetrical about the conductor part axis 70, as shown. The first conductor part 66 and the second conductor part 68 are substantially cylindrical along the conductor part axis 70.

The first conductor part 66 and the second conductor part 68 may be integrally formed. The root end part 62 and conductor part 64 may also be integrally formed. The connecting element 60 may be a rigid element, e.g. made of metal, which may be annealed. For example, the connecting element 60 may be made of tinned copper.

The conductor part 64 may receive the down conductor 50, such as an end of the down conductor 50, and the conductor part 64, such as the first conductor part 66 and/or the second conductor part 68 may be crimped to fastened to the down conductor 50. The first conductor part 66 is configured to receive and optionally fasten to a stripped part of the down conductor. The second conductor part 68 is configured to receive and fasten to an insulated part of the down conductor.

Figure 4:
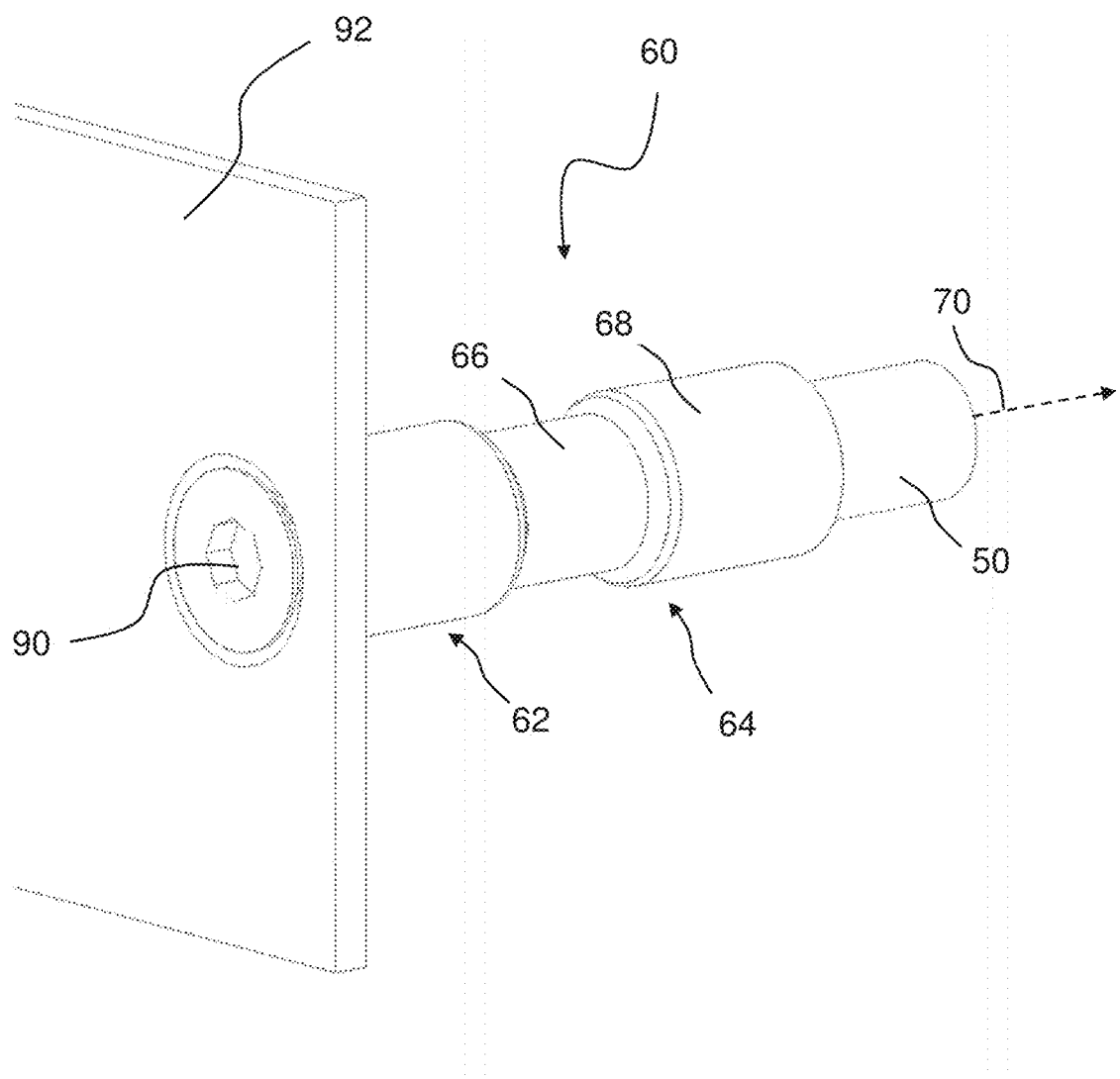
FIG. 4 is a schematic diagram illustrating an exemplary connecting element.

FIG. 4 shows an exemplary connecting element 60, such as the connecting element 60 as shown in FIG. 3. The connecting element comprises a root end part 62 and a conductor part 64 comprising a first conductor part 66 and a second conductor part 68 with a conductor part axis 70. The connecting element 60 comprises at the root end part 62 a fastening section (not shown) for engaging with a fastening element 90, such as a screw or a bolt, e.g. to fasten the connecting element 60 to the root region of the wind turbine blade, such as a root end flange 92.

Figure 5:
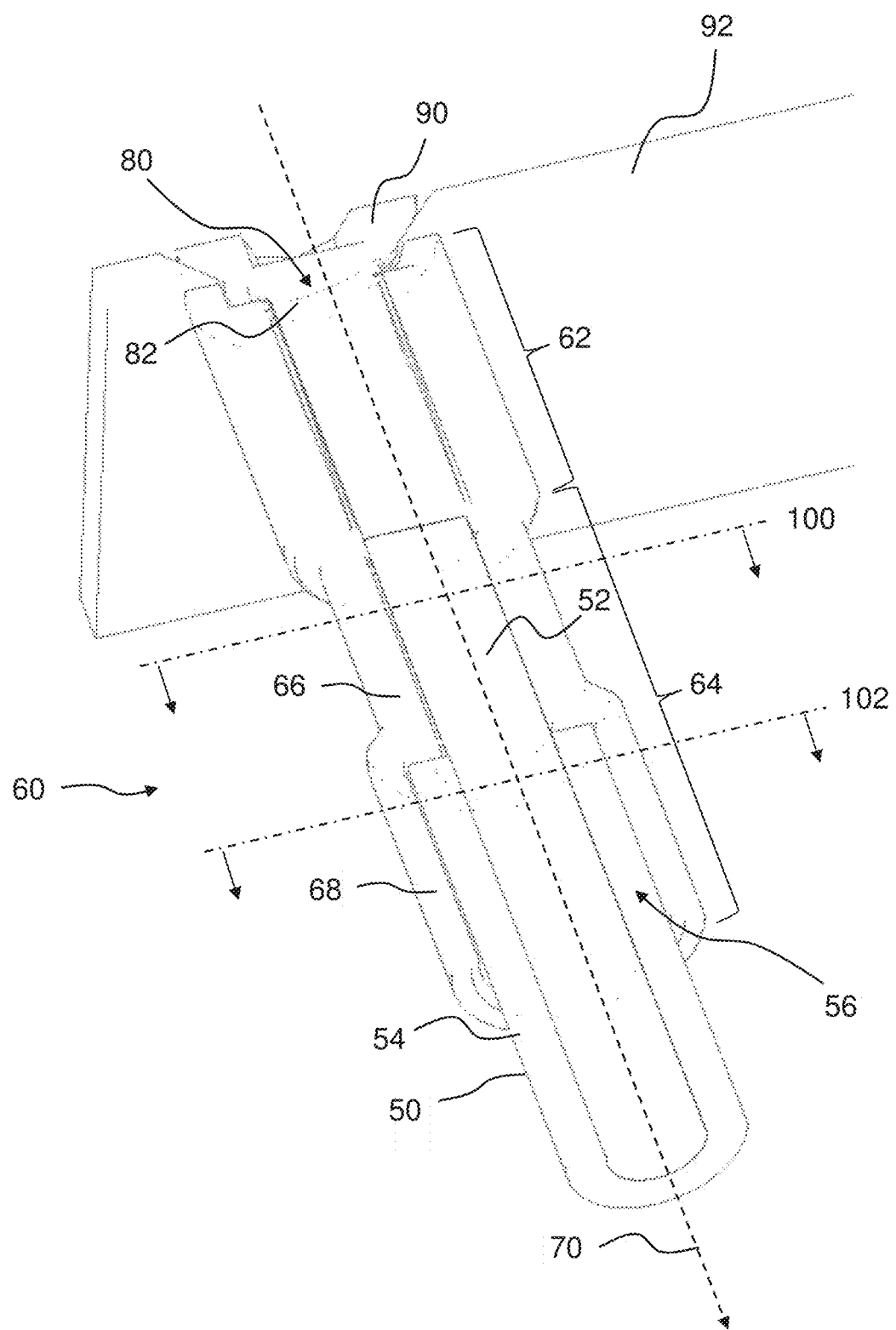
FIG. 5 is a schematic diagram illustrating a longitudinal sectional view of an exemplary connecting element.

FIG. 5 shows a longitudinal sectional view of an exemplary connecting element 60, such as the connecting element 60 as shown in FIG. 3 or FIG. 4. The connecting element 60 is connected to the root end flange 92 of a wind turbine blade. The connecting element 60 comprises a root end part 62 and a conductor part 64 with a conductor part axis 70. The conductor part 64 comprises a first conductor part 66 and a second conductor part 68, wherein the first conductor part 66 is configured to receive and electrically connect to a stripped part 52 of the down conductor 50, as shown. The second conductor part 68 is configured to receive and mechanically connect to an insulated part 54 of the down conductor 50, as shown. To mechanically connect the second conductor part 68 to the insulated part 54 of the down conductor, the second conductor part 68 may be crimped. The connecting element 60 comprises at the root end part 62 a fastening section 80 for engaging with a fastening element 90. The fastening section 80 is configured to fasten the connecting element 60 to the root region of the wind turbine blade, such as a root end flange 92, as shown. The fastening section 80 may comprise a hole 82, as shown. The fastening element 90 may be a screw or a bolt, e.g. with threads. The fastening element 90 may extend through a hole in the root end flange 92 as shown, and into the hole 82 to fasten the connecting element to the root end flange 92. The hole 82 may comprise corresponding threads for engaging with the fastening element 90.

Figure 6:
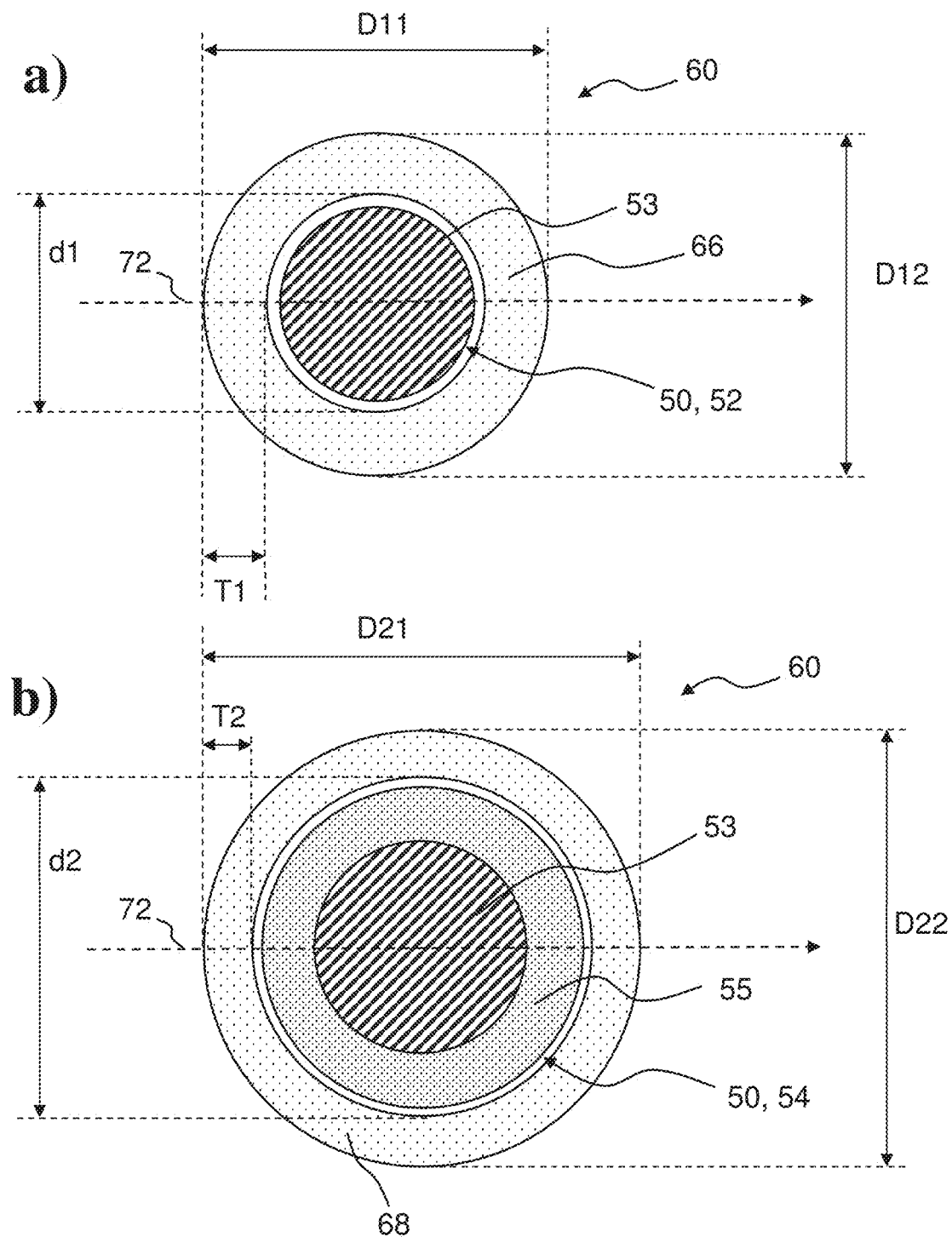
FIGS. 6a and 6b are a schematic diagram illustrating a cross section of an exemplary connecting element.

FIGS. 6a and 6b show cross sectional views of the connecting element 60 and the down conductor 50 of FIG. 5 along the lines 100 and 102, as indicated in FIG. 5. FIG. 6a shows the cross sectional view along the line 100. FIG. 6b shows the cross-sectional view along the line 102. The down conductor 50 comprises a conductive element 53, and an insulating sheath 55 covering the conductive element 50, in accordance with a conventional lightning down conductor. As seen in FIG. 6a, the insulating sheath 55 has been removed from a part of the down conductor to form the stripped part 52 being received in the first conductor part 66. Although not specifically shown, the first conductor part 66 may be electrically connecting with the conducting part 53 of the down conductor, e.g. the first conductor part 66 may be crimped to engage with the conducting part 53.

Also shown in FIGS. 6a and 6b is a radial axis 72 perpendicular to the conductor part axis 70 as shown in FIG. 5. The first conductor part 66 of the connecting element 60, has a first material thickness T1 along the radial axis 72. The second conductor part 68 has a second material thickness T2 along the radial axis. The second material thickness T2 may be smaller than the first material thickness T1, as shown. Alternatively, the second material thickness T2 may be bigger than the first material thickness T1, or the second material thickness T2 and the first material thickness T1 may be the same.

The first conductor part 66 may be fastened to the stripped part 52 of the down conductor 50 by crimping the first conductor part 66. The first conductor part 66 may be fastened by reducing a first cross-sectional distance D11 of the first conductor part 66, e.g. along the radial axis 72. Additionally, the first conductor part 66 may be fastened by reducing a second cross-sectional distance D12 of the first conductor part 66. The first conductor part 66 may be crimped such that the first cross-sectional distance D11 is shorter than the second cross-sectional distance D12. As seen the second cross-sectional distance D12 may be perpendicular to the first cross-sectional distance D11.

The second conductor part 68 may be fastened to the insulated part 54 of the down conductor 50 by crimping the second conductor part 68. The second conductor part 68 may be fastened by reducing a first cross-sectional distance D21 of the second conductor part 68, e.g. along the radial axis 72 as illustrated. Additionally, the second conductor part 68 may be fastened by reducing a second cross-sectional distance D22 of the second conductor part 68. The second conductor part 68 may be crimped such that the first cross-sectional distance D21 is shorter than the second cross-sectional distance D22. As seen the second cross-sectional distance D22 may be perpendicular to the first cross-sectional distance D21.

Internal cross-sectional distances d1, d2 of the first conductor part 66 and the second conductor part 68 are also shown in FIG. 6a and FIG. 6b. The first conductor part 66 has a first internal cross-sectional distance d1 allowing the first conductor part 66 to receive the stripped part 52 of the down conductor 50. The second conductor part 68 has a second internal cross-sectional distance d2 allowing the second conductor part to receive the insulated part 54 of the down conductor 50.

Figure 7A:
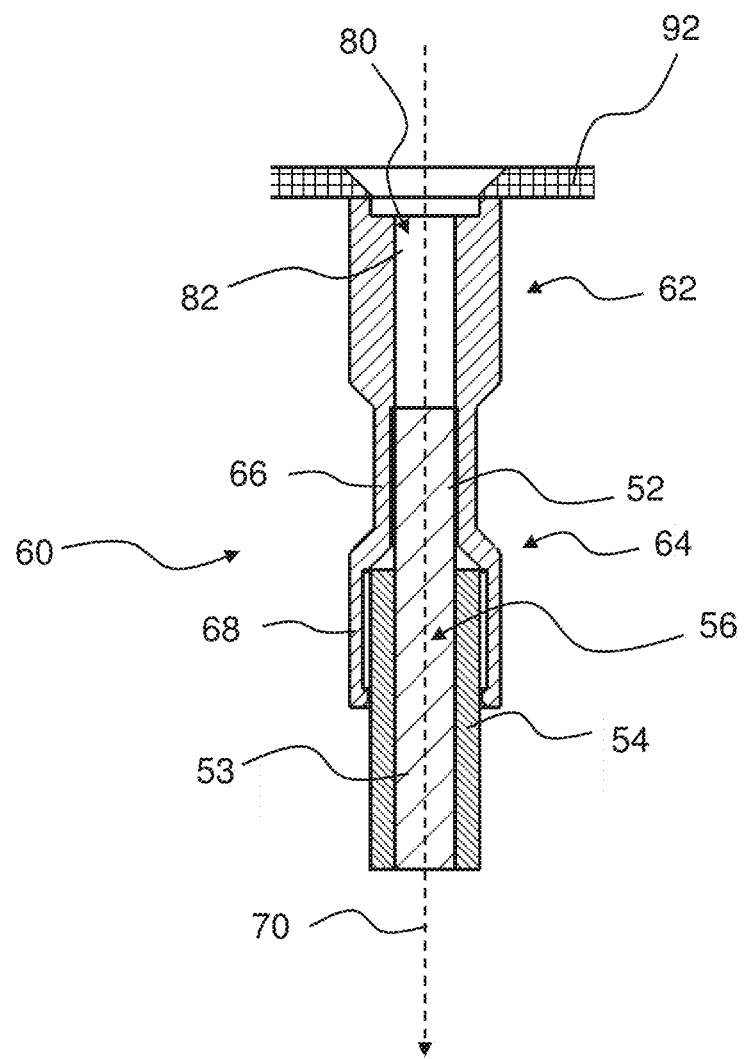
FIG. 7a, 7b, 7c, 7d are schematic diagrams illustrating longitudinal sectional views of an exemplary connecting element.
Figure 7B:
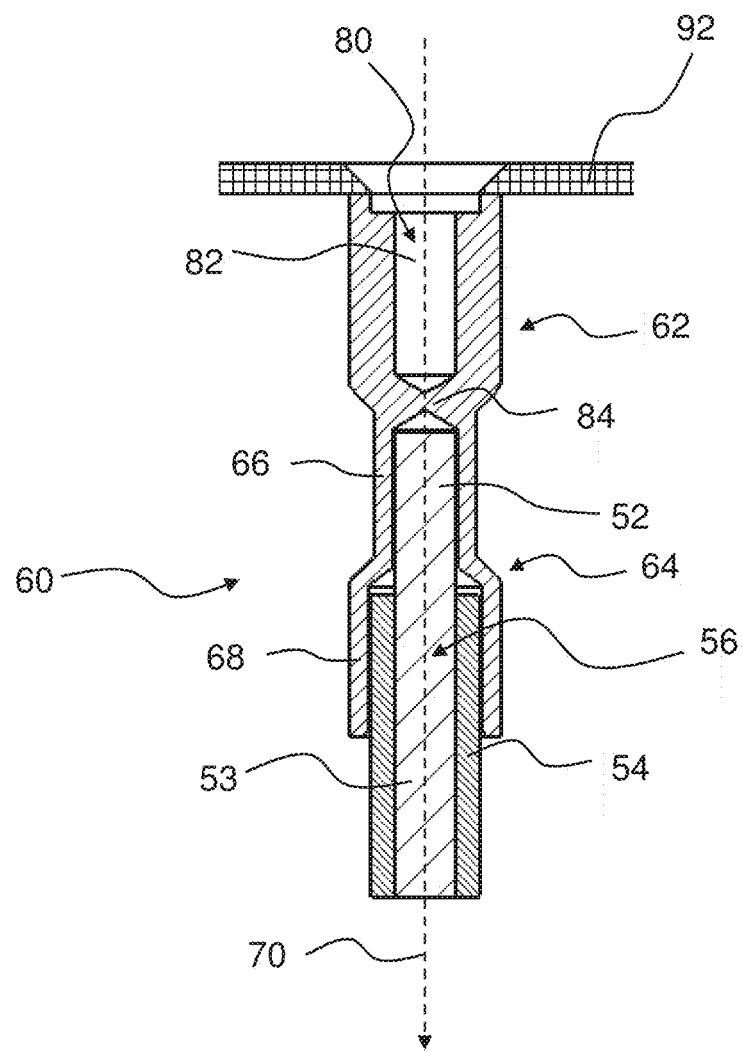
Figure 7C:
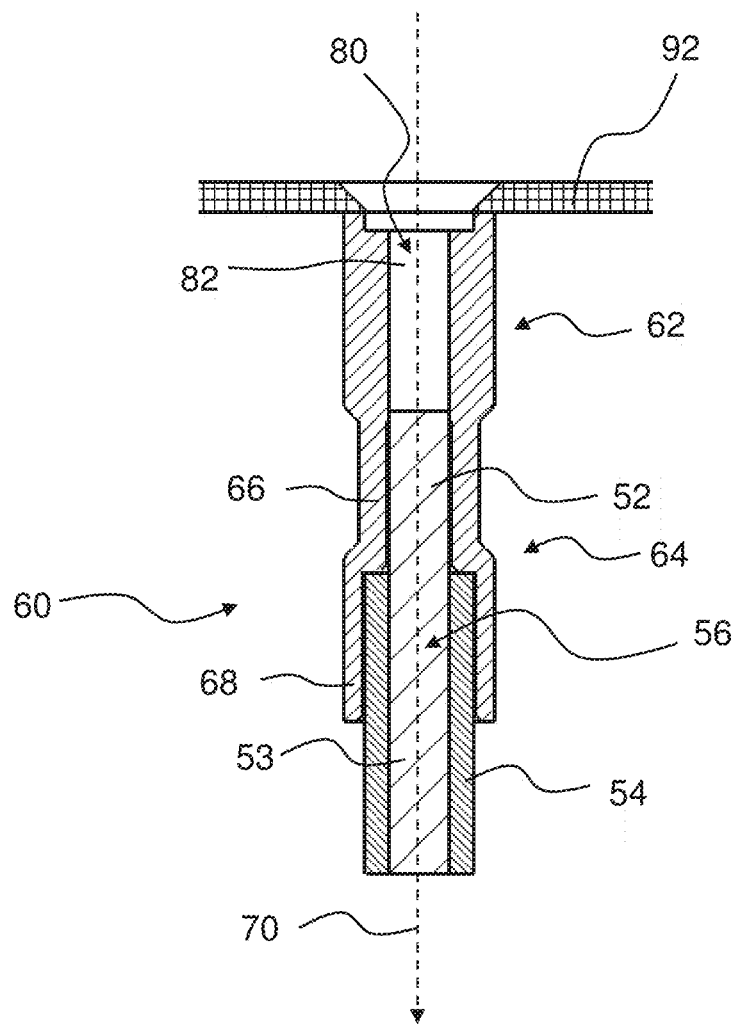
Figure 7D:
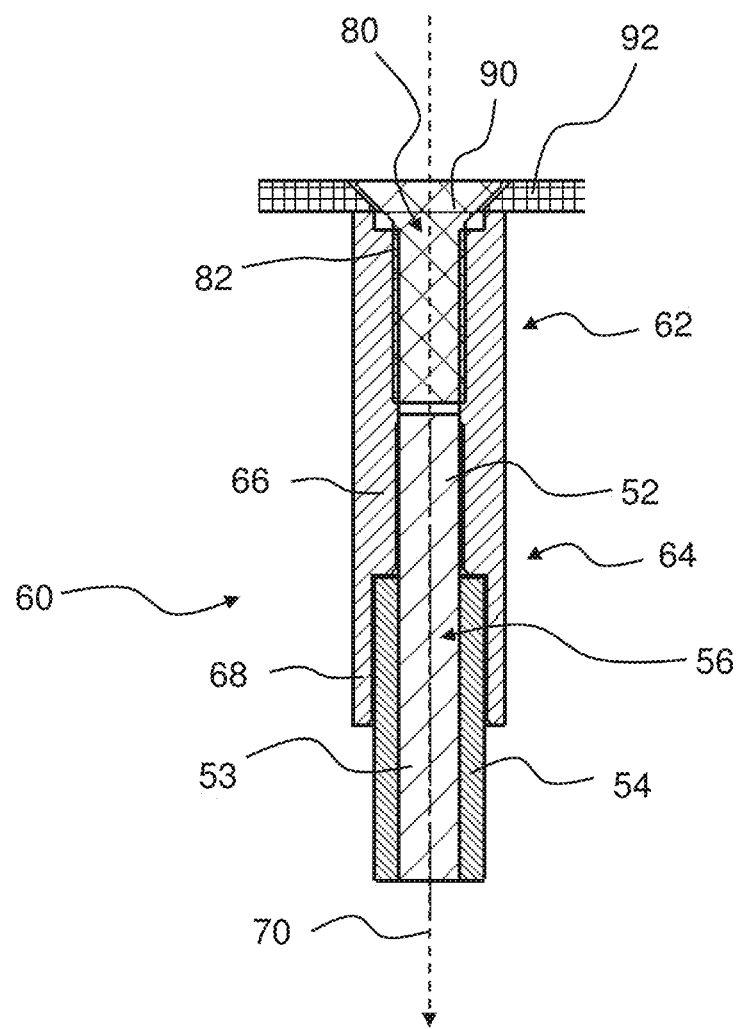

FIGS. 7a, 7b, 7c and 7d show longitudinal sectional views of exemplary connecting elements 60. The connecting element 60 comprises a root end part 62 and a conductor part 64 comprising a first conductor part 66 and a second conductor part 68 with a conductor part axis 70. The connecting element 60 comprises at the root end part 62 a fastening section 80 for engaging with a fastening element 90 (e.g. as shown in FIG. 7d) to fasten the connecting element 60 to the root region 30 of the wind turbine blade. The exemplary connecting elements 60 of FIGS. 7a-7d show examples of different material thicknesses, e.g. T1 and T2 as described in relation to FIG. 6.

FIG. 7b also shows that the connecting element 60 may have an internal separation structure 84 separating the fastening element 90, e.g. when inserted into the hole of the fastening section 80, from the stripped part 52 of the down conductor.

Furthermore, FIG. 7d shows the connecting element 60 being fastened to the root end region 30 by a fastening element 90, which may be a screw or a bolt, being engaged with the hole 82 of the fastening section 80.

The connecting element 60 may provide for a gap between the edges of the end of the insulated part of the down conductor 54 and the inside of the conductor part 64 of the connecting element, such as illustrated in FIGS. 7a and 7b. The gap may provide for a guiding surface for guiding the stripped part 52 into the first conducting part 66.

Figure 8:
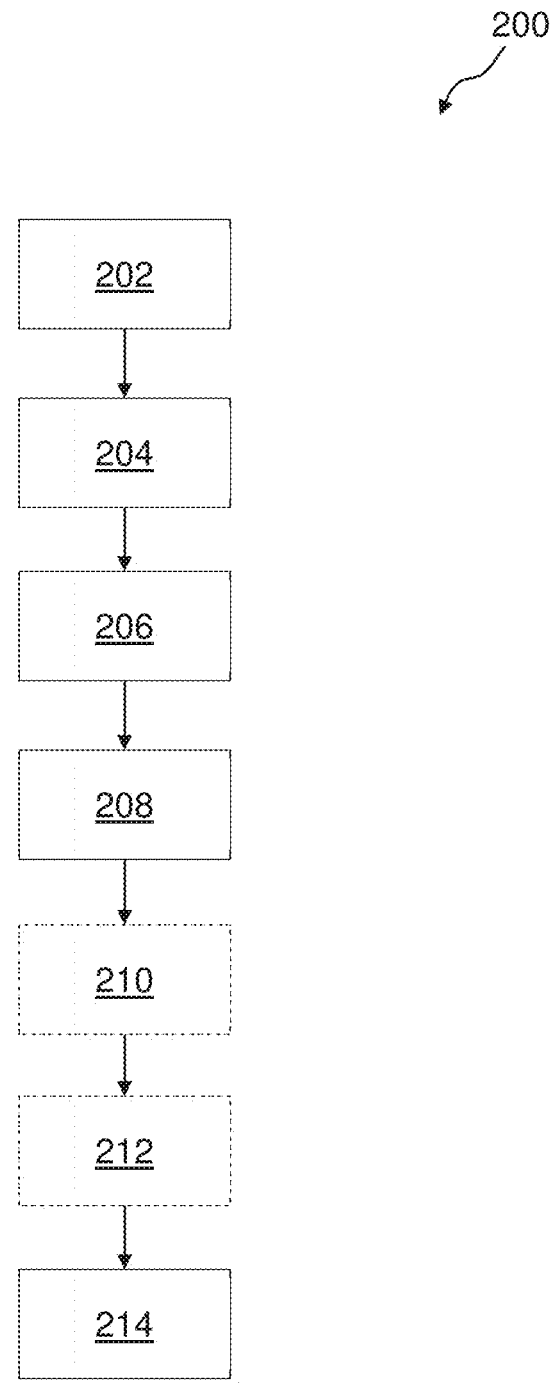
FIG. 8 is a flow diagram illustrating an exemplary method of connecting an exemplary connecting element.

FIG. 8 shows a flow diagram of an exemplary method 200, for connecting a down conductor of a lightning protection system of a wind turbine blade to the root region of the wind turbine blade, e.g. to a root end flange of the wind turbine blade.

The method 200 comprises providing a connecting element 202, such as a connecting element as illustrated and described in relation to previous figures. The connecting element comprising a root end part and a conductor part, the conductor part comprising a first conductor part and a second conductor part.

The method 200 comprises removing 204 an insulating sheath from a portion of an end part of the down conductor to provide a stripped part and an insulated part of the down conductor.

The method 200 comprises inserting 206 the end part of the down conductor into the conductor part of the connecting element, such that the stripped part is received by the first conductor part and the insulated part is received by the second conductor part of the connecting element.

The method 200 comprises fastening 208 the second conductor part to the insulated part. For example, the second conductor part may be fastened 208 by crimping the second conductor part, e.g. around the insulated part of the down conductor. Crimping the second conductor part may comprise reducing one or more cross-sectional distances of the second conductor part.

Optionally, the method 200 may comprise fastening 210 the first conductor part to the stripped part of the down conductor. For example, the first conductor part may be fastened 210 by crimping the first conductor part, e.g. around the stripped part of the down conductor. Crimping the first conductor part may comprise reducing one or more cross-sectional distances of the first conductor part.

Fastening 208 of the second conductor part may be performed before or after fastening 210 of the first conductor part. Alternatively, fastening 208 of the second conductor part may be performed together with fastening 210 of the first conductor part, e.g. fastening 208 of the second conductor part may be performed simultaneously with fastening 210 of the first conductor part.

Figure 9:
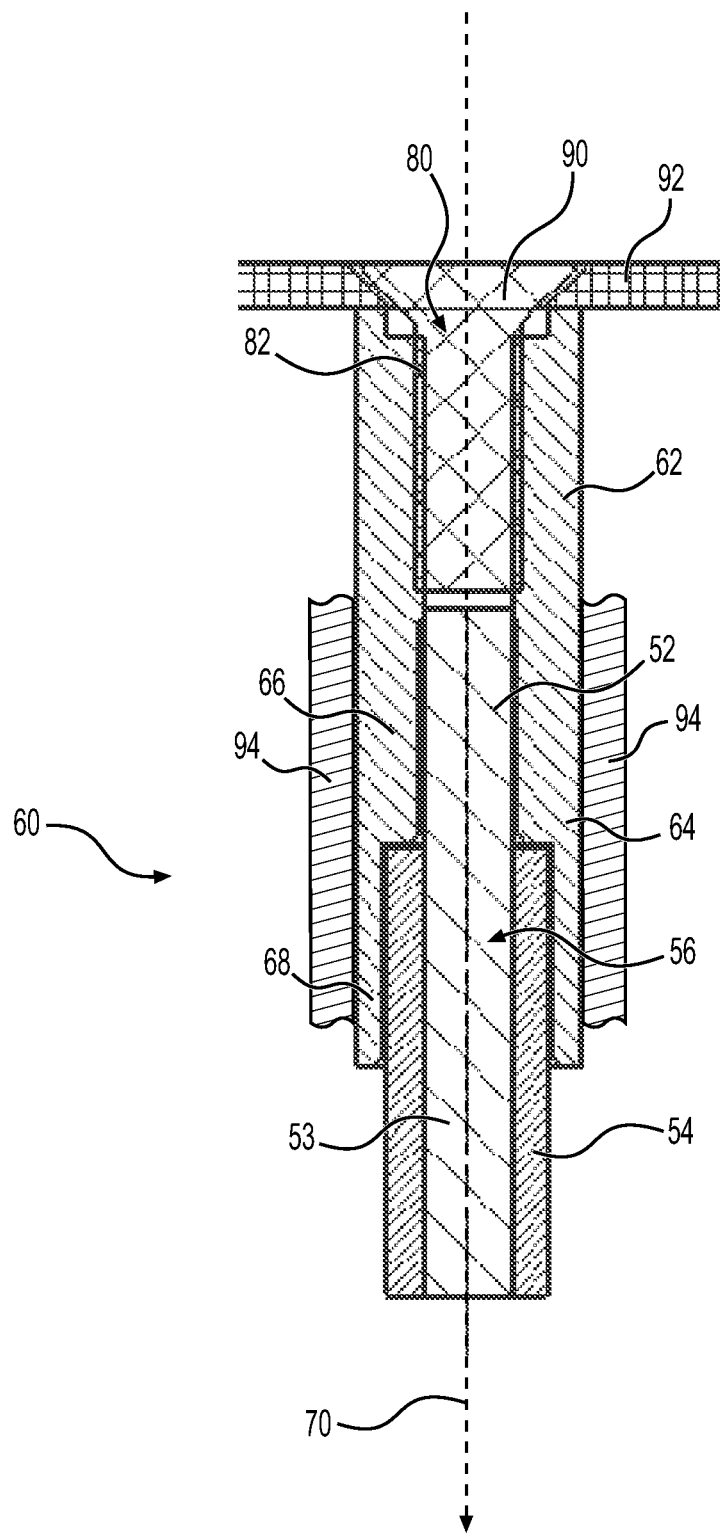
FIG. 9 is a schematic diagram illustrating a longitudinal sectional view of an exemplary connecting element.

Optionally, the method 200 may comprise enclosing 212 the conductor part of the connecting element with a second insulating sheath 94, such as a shrinkable tubing or a heat-shrink tubing. Enclosing 212 the conductor part with a second insulating sheath 94 may be provided to isolate the connecting element from the environment, e.g. to protect the connecting element and/or the connecting with the down conductor from water or other substances. FIG. 9 is a schematic diagram illustrating the longitudinal sectional view of the exemplary connecting element 60 as also illustrated in FIG. 7d, wherein the conductor part 64 is enclosed by a second insulating sheath 94.

The method 200 comprises fastening 214 the root end part of the connecting element to the root region of the wind turbine blade, such as to a root end flange of the wind turbine blade.

The invention has been described with reference to preferred embodiments. However, the scope of the invention is not limited to the illustrated embodiments, and alterations and modifications can be carried out without deviating from the scope of the invention.

LIST OF REFERENCES 2 wind turbine
4 tower
6 nacelle
8 hub
10 blade
14 blade tip
15 tip end
16 blade root
17 root end
18 leading edge
20 trailing edge
24 first blade shell part (pressure side)
26 second blade shell part (suction side)
28 bond lines/glue joints
30 root region
32 transition region
34 airfoil region
40 shoulder
42 Lightning protecting system
50 Down conductor
52 Stripped part (of the down conductor)
53 conductive element
54 Insulated part (of the down conductor)
55 insulating sheath
56 End part of the down conductor
60 Connecting element
62 Root end part
64 Conductor part
66 First conductor part
68 Second conductor part
70 Conductor part axis
72 Radial axis
80 Fastening section
82 Hole (of the fastening section)
84 internal separation structure
90 Fastening element
92 root end flange
200 method
202 providing connecting element
204 removing insulating sheath
206 inserting end part of down conductor 208 fastening second conductor part
210 fastening first conductor part
212 enclosing conductor part
214 fastening root end part
T1 First material thickness
T2 Second material thickness
D11 first cross-sectional distance of first conductor part
D12 second cross-sectional distance of first conductor part
D21 first cross-sectional distance of second conductor part
D22 second cross-sectional distance of second conductor part

The invention claimed is:

1. A wind turbine blade comprising a root region, an airfoil region with a tip, a pressure side, a suction side and a chord line extending between a leading edge and a trailing edge, the wind turbine blade further comprising a lightning protection system comprising a down conductor extending from the root region towards the tip and a connecting element connecting the down conductor to the root region, such that the down conductor extends from the connecting element towards the tip, the connecting element comprising:
 a root end part mechanically and electrically connected to the root region of the wind turbine blade; and
 a conductor part arranged towards the tip of the wind turbine blade relative to the root end part, wherein the conductor part comprises a first conductor part and a second conductor part, wherein the first conductor part is receiving and electrically connecting to a stripped part of the down conductor and the second conductor part is receiving and mechanically connecting to an insulated part of the down conductor, a conductor part axis of the conductor part is substantially coaxial with a longitudinal direction of the down conductor, and wherein the first conductor part and the second conductor part are substantially cylindrical along the conductor part axis, and wherein the second conductor part is arranged towards the tip of the wind turbine blade relative to the first conductor part.

2. The wind turbine blade according to claim 1, wherein the first conductor part and the second conductor part are integrally formed.

3. The wind turbine blade according to claim 1, wherein the first conductor part has a first material thickness along a radial axis perpendicular to the conductor part axis, and the second conductor part has a second material thickness parallel to the radial axis.

4. The wind turbine blade according to claim 3, wherein the second material thickness is bigger than the first material thickness.

5. The wind turbine blade according to claim 3, wherein the second material thickness is smaller than the first material thickness.

6. The wind turbine blade according to claim 3, wherein the second material thickness and the first material thickness are the same.

7. The wind turbine blade according to claim 1, wherein the connecting element is made of a metal, such as copper.

8. The wind turbine blade according to claim 1, wherein the root end part comprises a fastening section engaging with a fastening element to fasten the connecting element to the root region of the wind turbine blade.

9. The wind turbine blade according to claim 8, wherein the fastening section comprises a hole for receiving the fastening element, wherein the hole may be internally threaded to engage with opposing threads of the fastening element.

10. A method for connecting a down conductor of a lightning protection system of a wind turbine blade to the root region of the wind turbine blade, the wind turbine blade comprising a root region, an airfoil region with a tip, a pressure side, a suction side and a chord line extending between a leading edge and a trailing edge, the down conductor extending from the root region towards the tip and comprising a conductive element and an insulating sheath covering the conductive element, the method comprising:
 providing a connecting element comprising a root end part and a conductor part, the conductor part comprising a first conductor part and a second conductor part, the first conductor part and the second conductor part are substantially cylindrical along a conductor part axis of the conductor part,
 removing the insulating sheath from a portion of an end part of the down conductor to provide a stripped part and an insulated part of the down conductor, the down conductor extending from the end part of the down conductor towards the tip of the wind turbine blade;
 inserting the end part of the down conductor into the conductor part of the connecting element, such that the stripped part is received by the first conductor part and the insulated part is received by the second conductor part of the connecting element, and such that a longitudinal direction of the down conductor is substantially coaxial with the conductor part axis, such that the down conductor extends from the connecting element towards the tip of the wind turbine blade;
 fastening the second conductor part to the insulated part; and
 fastening the root end part of the connecting element to the root region of the wind turbine blade.

11. The method according to claim 10, wherein fastening the second conductor part to the insulated part comprises crimping the second conductor part.

12. The method according to claim 10, further comprising fastening the first conductor part to the stripped part of the down conductor.

13. The method according to claim 10, wherein fastening the first conductor part to the stripped part comprises crimping the first conductor part.

14. The method according to claim 10, wherein the method further comprises enclosing the conductor part of the connecting element with a second insulating sheath.

* * * * *